(12) United States Patent
Derscheid et al.

(10) Patent No.: US 11,205,337 B1
(45) Date of Patent: Dec. 21, 2021

(54) RADIO FREQUENCY IDENTIFICATION (RFID) SENSOR NETWORK FOR A WORK MACHINE

(71) Applicant: DEERE & COMPANY, Moline, IL (US)

(72) Inventors: Daniel E. Derscheid, Ottumwa, IA (US); Cole L. Murray, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/151,932

(22) Filed: Jan. 19, 2021

(51) Int. Cl.
*A01F 15/08* (2006.01)
*G07C 3/00* (2006.01)
*F16P 3/14* (2006.01)
*G08B 21/18* (2006.01)
*G06K 19/07* (2006.01)

(52) U.S. Cl.
CPC ............ *G08B 21/187* (2013.01); *A01F 15/08* (2013.01); *G06K 19/0717* (2013.01); *G06K 19/0723* (2013.01); *G08B 21/182* (2013.01)

(58) Field of Classification Search
CPC .................................................. G08B 21/187
See application file for complete search history.

(56) References Cited

U.S. PATENT DOCUMENTS

| 6,203,114 | B1* | 3/2001 | Ehrlich | G01K 11/06 |
| | | | | 301/124.1 |
| 8,384,266 | B2* | 2/2013 | Fish | H02K 11/20 |
| | | | | 310/248 |
| 9,726,133 | B1* | 8/2017 | Malesevich | F02N 11/0803 |
| 2017/0287303 | A1* | 10/2017 | Lang | A01F 15/08 |
| 2021/0204482 | A1* | 7/2021 | Hamilton | G01N 35/00693 |

* cited by examiner

*Primary Examiner* — Joseph H Feild
*Assistant Examiner* — Pameshanand Mahase
(74) *Attorney, Agent, or Firm* — Taft Stettinius & Hollister LLP; Stephen F. Rost

(57) ABSTRACT

An agricultural work machine, an agricultural work machine control system, and method for an agricultural work machine having RFID tags to determine a fault condition of machine components, devices, parts or systems. The RFID tags are located on, at, or near machine components or systems to sense a temperature of those components or systems. A receiver/transmitter interrogates the RFID tags and receives the sensed temperatures, and component identifiers. A controller receives the temperatures from the receiver/transmitter and compares the received temperatures to a threshold to determine whether a fault condition exists. If so, the controller transmits an alert signal to a user interface to indicate that a fault condition exists with an identified component, part, device, or system.

20 Claims, 8 Drawing Sheets

RADIO FREQUENCY IDENTIFICATION (RFID) SENSOR NETWORK FOR A WORK MACHINE

FIELD OF THE DISCLOSURE

The present disclosure relates to a work machine, and more particularly to a method and apparatus to identify a fault condition of a component of an agricultural work machine.

BACKGROUND

Work machines are configured to perform a wide variety of tasks for use as construction machines, forestry machines, lawn maintenance machines, as well as on-road machines such as those used to plow snow, spread salt, or machines with towing capability. Additionally, work machines include agricultural machines, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field at a designated speed. Tractors often include a power takeoff (PTO) which includes a shaft coupled to the transmission and driven by the engine to power a machine being pulled or pushed through a field by the tractor. Other agricultural work machines include machines pulled by a tractor, for instance, pull type combines, pull type harvesters, pull type balers, seeders, and spreaders. Work machines are also known as work vehicles.

Tractors can be steered through a field by a manual command provided by an operator located in a cab through a manually controlled steering device, such as a steering wheel or joystick, or by an automatic steering command. In the case of an automatic steering command, a steering control signal can be provided by a global positioning system (GPS) signal. Steering control systems often include one or more sensors configured to sense a position of the steering device or a position of the wheels with respect to a frame of the machine.

Harvesting machines, such as hay and foraging machines utilized in the processing of plant material can include mowers, conditioners, flail choppers, windrowers, combines, forage harvesters, and balers for both dry and silage uses. Such harvesting machines are often pulled by the tractor through a field. Self-propelled harvesting machinery is also known.

Historically, tractors and harvesting machines have been driven by an operator. One of the tasks the operator performed was to "listen" to the machine during operation to make sure there are no damaged or broken components on the machine. In some work vehicles, however, a damaged or broken component may not provide a sound that indicates a part is damaged or broken, and may only be noticed by a work machine failing to properly carry out an operation, i.e. a fault condition.

In some machines, temperature sensors are used to identify systems, parts, or devices, that are experiencing fault conditions. In some machines, temperature sensing is done with stationary thermocouples in engines, oil baths, or air intakes, for example. These sensors are connected by wire to a controller. Various sensors are also attached to moving parts, for example a rotating shaft. Communication to a processing unit can occur via wire with a slip ring, or wirelessly with a powered (battery powered) beacon; which are expensive and require frequent maintenance.

Today's agricultural equipment is becoming more complex with higher expectations for reliability. Predictive monitoring of equipment can reduce costly downtime, for example saving hay that needs to be baled when the rain clouds are rolling in. The cost of sensors for all of the potential failure locations, the challenge of mounting them on moving parts, and connecting them to a processing unit, make it impractical and cost prohibitive to implement. In other circumstances, the fact that a machine is failing to work as intended, may not be noticeable as there may not be warning signs to indicate that a part is failing or has failed. What is needed, therefore, is a system to identify a fault condition in a machine part, device, or component, and in particular to identify a fault condition before the part experiencing the fault condition fails completely.

SUMMARY

In one embodiment, there is provided a method of detecting a fault condition in one or more balers, each of which includes a crop feed system and a bale chamber, wherein each of the one or more balers is configured to bale cut crop. The method includes: identifying at least one location in the one or more balers, wherein the at least one identified location generates heat during an operation of a component of the crop feed system or the bale chamber; placing a radio frequency identification (RFID) tag at the at least one identified location, wherein the RFID tag includes a temperature sensing feature; receiving transmitted data from the RFID tag; identifying, from the received data, a temperature value of the at least one identified location; and providing an indictor based on the identified temperature value.

In another embodiment, there is provided a system for identifying a fault condition in one or more balers, each of which includes a plurality of components. The system includes one or more RFID tags, wherein each of the one or more RFID tags includes a temperature sensor and a coupler to connect each one of the one or more RFID tags to a location at, near, or on one of the plurality of components. A receiver is configured to receive temperature information from each of the one or more RFID tags. A controller is operatively connected to the receiver and to a user interface, wherein the controller includes a processor and a memory. The memory is configured to store program instructions and the processor is configured to execute the stored program instructions to: receive temperature information from the receiver; identify a fault condition of one or more of the plurality of components based on the received temperature information; and display an indicator at the user interface based on the identified fault condition.

In a further embodiment, there is provided a baler configured to bale cut crop. The baler includes a crop feed system, a bale chamber, and one or more RFID tags, each of which includes a temperature sensing feature. Each of the one or more RFID tags is located on, at, or near a component of one the crop feed system, or the bale chamber. An RFID tag reader is configured to receive temperature information from the one or more RFID tags. The baler further includes a user interface having one or more indicators and a controller operatively connected to the user interface and to the RFID tag reader. The controller includes a processor and a memory. The memory is configured to store program instructions and the processor is configured to execute the stored program instructions to: receive the temperature information from the RFID tag reader; identify a fault condition of one or more of the plurality of components based on the received temperature information; and activate one of the one or more indicators at the user interface based on the identified fault condition.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
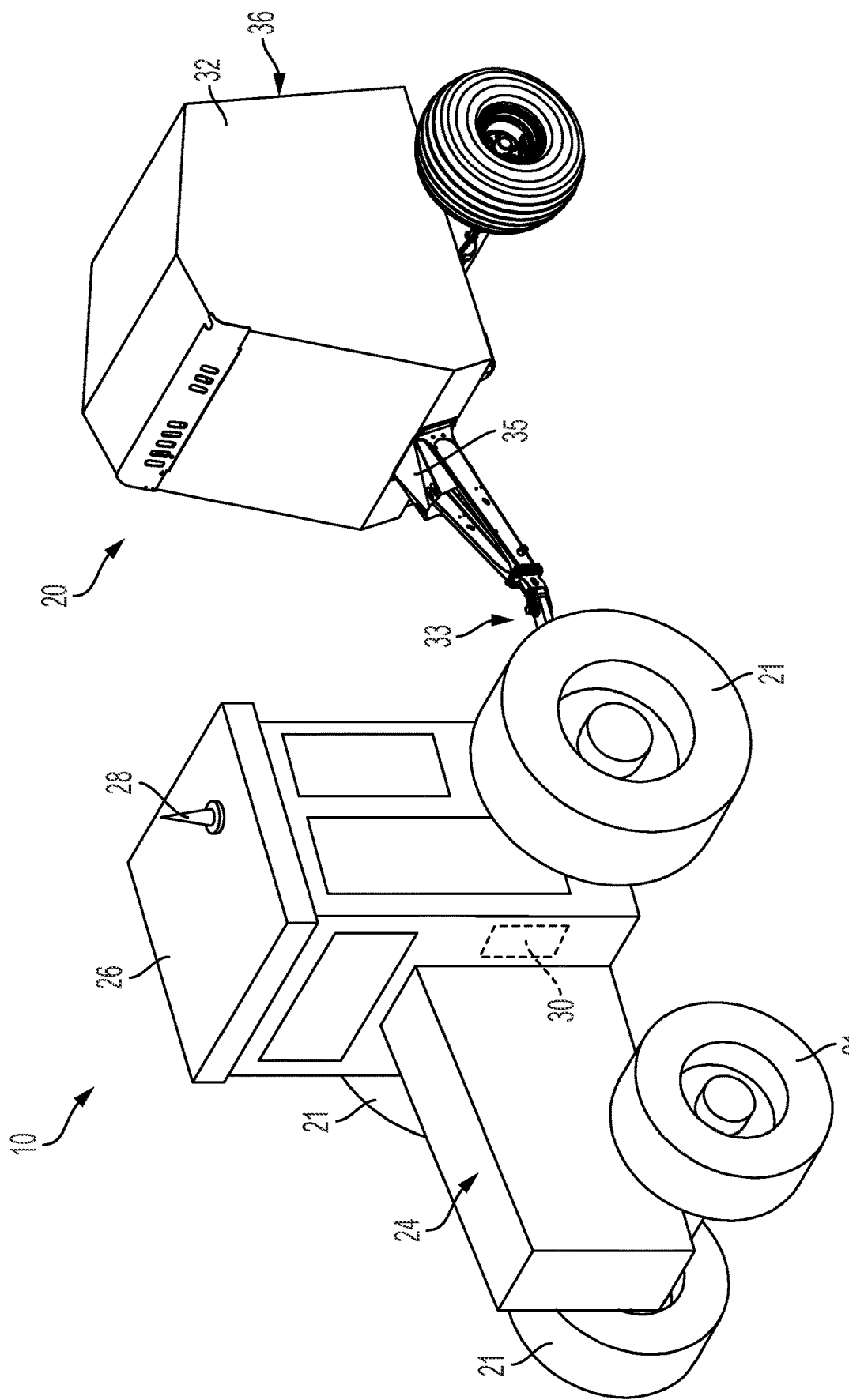
FIG. 1 is a perspective view of an example baler towed by an agricultural machine.

Referring now to FIG. 1, an agricultural machine 10, such as a tractor, is coupled to a round baler 20 which is towed across a field by the agricultural machine 10. (It will be understood that various other configurations are also possible. For example, the disclosed systems and methods may be utilized with a variety of balers or other harvesting machines, either puled by a machine or a self-propelled machine.) The tractor 10 includes a frame supported by wheels 21 which are driven by an engine, not shown, located in a housing 24, also supported by the frame. A cab 26 is supported by the frame and includes an operator station configured to enclose a user operating the tractor 10 with a user control console, as is understood by one skilled in the art. An antenna 28 is located on the cab 26 and is configured to receive and to transmit wireless signals to and from an externally located source of data information, such as is available over the web through a cloud system, or to and from a global positioning system (GPS) 29 (See FIG. 4) which is configured to supply location information machine control information to a tractor controller 30. In different embodiments, for instance, the GPS system directs the machine 10 through the field along a predetermined path to provide for planting, harvesting, plowing, and fertilizing. Other machine functions are contemplated.

The round baler 20 includes a housing 32. The housing 32 is attached to and supported by a frame 22 of the baler 20. The housing 32 may include one or more walls or panels that at least partially enclose and/or define an interior region. The round baler 20 further includes a gate 36. (See FIGS. 1 and 2.) The gate 36 may include one or more walls or panels that at least partially enclose and/or define the interior region. As such, the housing 32 and the gate 36 cooperate to define the interior region therebetween.

As baler 20 moves across a field (e.g., as towed by machine 10 via connection 33) and encounters a windrow or other arrangement of material (not shown), a pick-up assembly 48 (See FIG. 3) gathers the material and moves it up and into baler 20 for processing. As a result of this processing, as described in greater detail below, a round bale is formed and ejected from the gate 36 of baler 20. The connection 33 also includes a power take-off, as is understood by one skilled in the art, and a gearbox (not shown) located within a housing 35.

Figure 2:
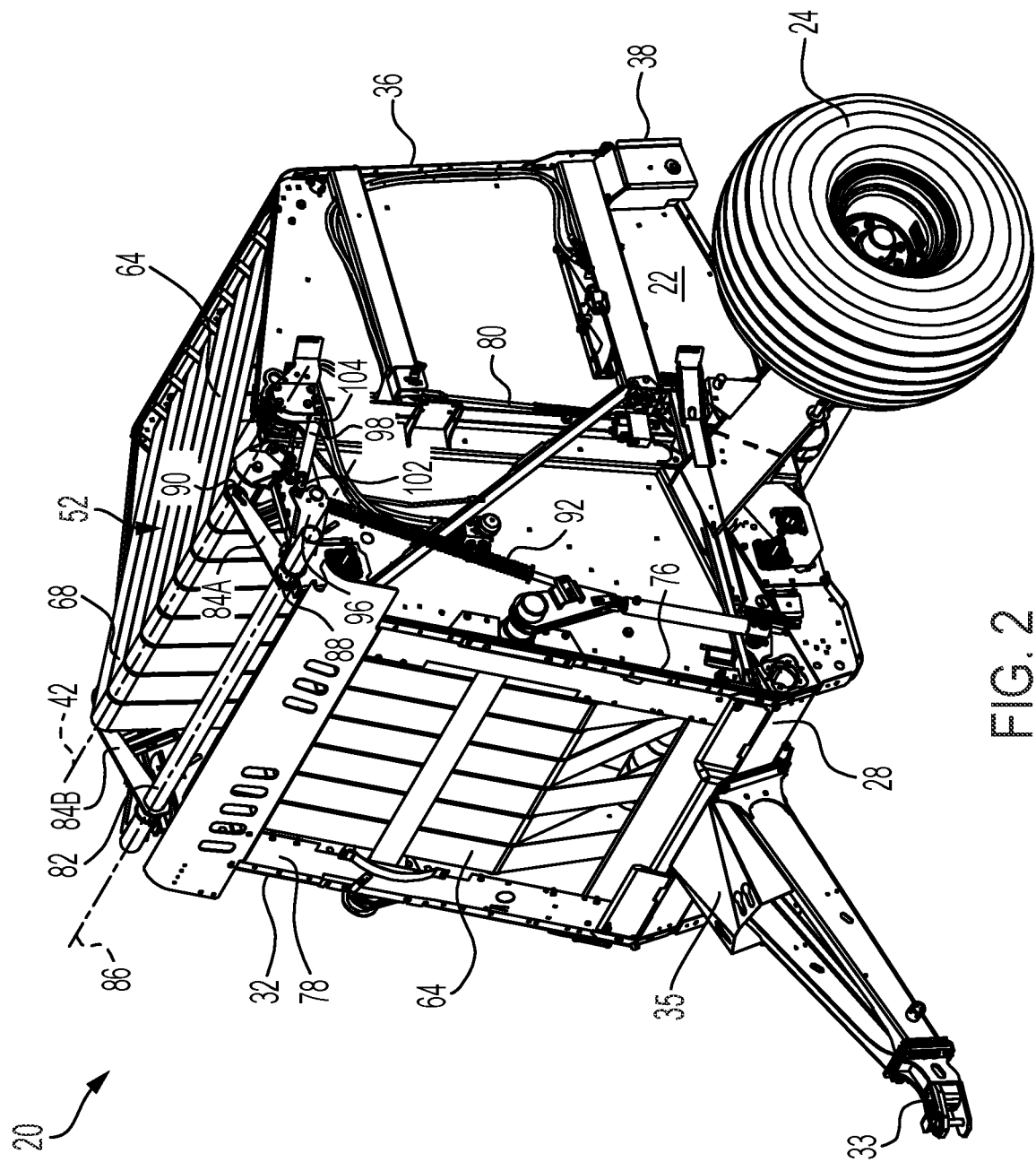
FIG. 2 is a perspective view of the baler of FIG. 1, with portions of the cover of the baler removed.
Figure 3:
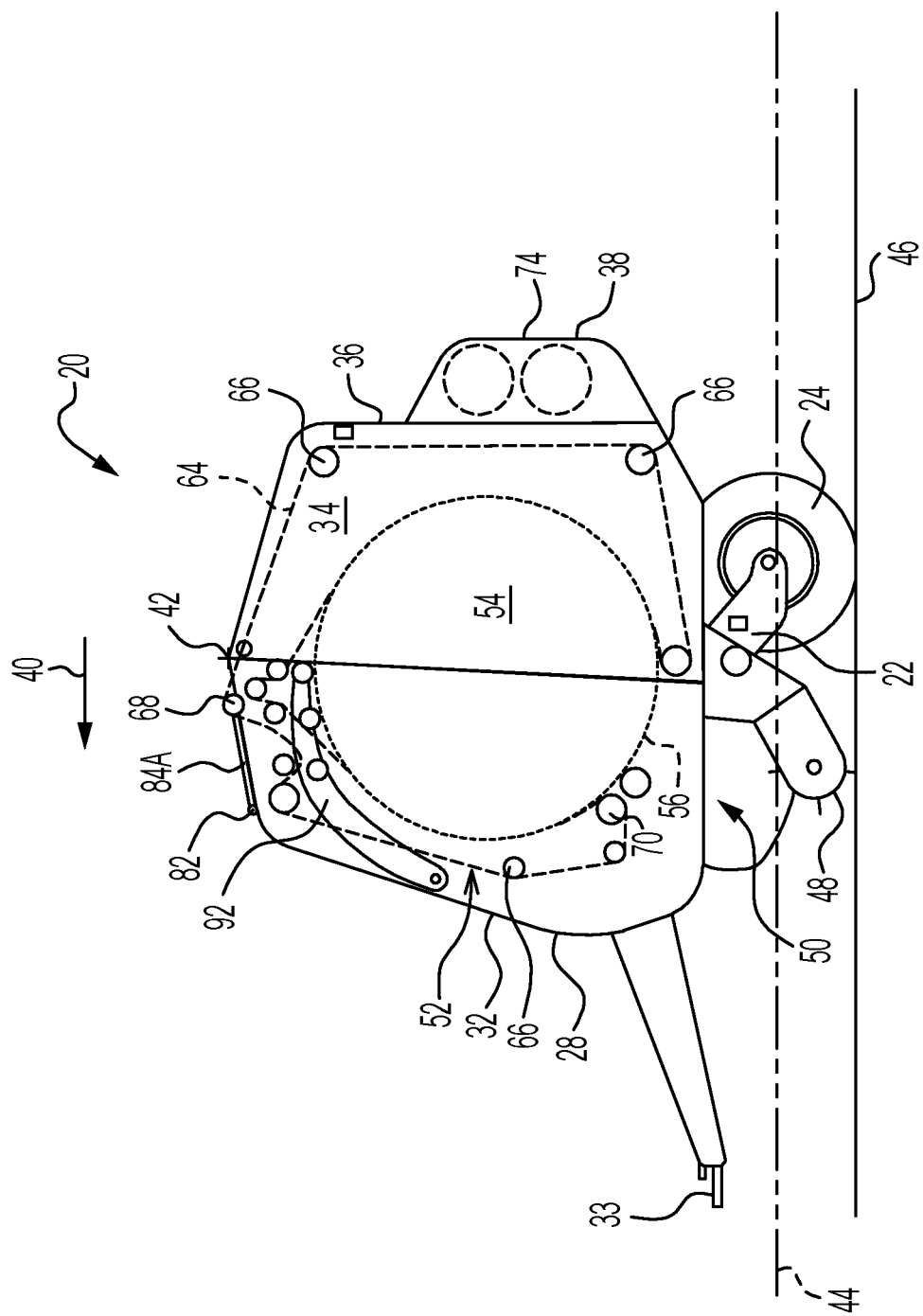
FIG. 3 is a schematic elevational side view of the baler of FIG. 2.

As seen in FIGS. 2 and 3, the gate 36 is attached to and rotatably supported by the housing 32. The gate 36 is positioned adjacent a rearward end 38 of the frame 22 relative to a direction of travel 40 of the round baler 20 while gathering crop material, and is pivotably moveable about a gate rotation axis 42. The gate rotation axis 42 is generally horizontal and perpendicular to a central longitudinal axis 44 of the frame 22. The central longitudinal axis 44 of the round baler 20 extends between the forward end 28 and the rearward end 38 of the round baler 20. The gate 36 is moveable between a closed position for forming a bale 56 within the interior region 34, and an open position for discharging the bale 56 from the interior region 34 onto a ground surface 46

The round baler 20 includes the pick-up 48 disposed proximate the forward end of the frame 22. The pick-up 48 gathers crop material from the ground surface 46 and directs the gathered crop material toward and into an inlet 50 of the interior region 34. The pickup may include, but is not limited to tines, forks, augers, conveyors, baffles, etc., for gathering and moving the crop material. The round baler 20 may be equipped with a pre-cutter (not shown), disposed between the pickup and the inlet 50. As such, the pre-cutter is disposed downstream of the pickup and upstream of the inlet 50 relative to movement of the crop material. As is understood by those skilled in the art, the pre-cutter cuts or chops the crop material into smaller pieces.

A bale formation system 52 is disposed within the interior region 34 and defines baling chamber 54, within which bale 56 is formed. The bale formation system 52 is operable to form the bale 56 to have a cylindrical shape.

The bale formation system 52, in one embodiment, is configured as a variable chamber baler. Referring to FIGS. 2 and 3, and as is understood by those skilled in the art, the variable chamber baler includes at least one, and may include a plurality of longitudinally extending side-by-side forming belts 64 that are supported by a plurality of rollers 66. The forming belts 64 define the baling chamber 54 and move in an endless loop to form crop material into the bale 56. The bale 56 is formed by the forming belts 64 and one or more side walls of the housing 32 and gate 36. As is understood by those skilled in the art, the forming belts 64 are controlled to vary the diametric size of the baling chamber 54.

The plurality of rollers 66 support the forming belts 64. At least one of the rollers 66 is a take-up roller 68. The take-up roller 68 is moveably coupled to one of the gate 36 or the housing 32, and is operable or moveable to decrease slack in the forming belts 64 when the gate 36 of the round baler 20 is opened. Additionally, at least one of the plurality of rollers 66 may include a drive roller 70 that is operable to drive the forming belts 64 in the endless loop through frictional engagement between the forming belts 64 and the drive roller 70.

The crop material is directed through the inlet 50 and into the baling chamber 54, whereby the forming belts 64 roll the crop material in a spiral fashion into the bale 56 having the cylindrical shape. The belts apply a constant pressure to the crop material as the crop material is formed into the bale 56. A belt tensioner 72 continuously moves one or more of the rollers 66, and thereby the forming belts 64, radially outward relative to the centerline 62 of the cylindrical bale 56 as a diameter of the bale 56 increases. The belt tensioner 72 maintains the appropriate tension in the belts to obtain the desired density of the crop material.

As shown in FIG. 3, the round baler 20 may include a wrap system 74. The wrap system 74 is operable to wrap the bale 56 with a wrap material inside the baling chamber 54. Once the bale 56 is formed to a desired size, the wrap system 74 feeds a wrap material into the baling chamber 54 to wrap the bale 56 and thereby secure the crop material in a tight package and maintain the desired shape of the bale 56. The wrap material includes, but is not limited to, a twine, a net mesh, or a solid plastic wrap. Movement of the gate 36 into the open position simultaneously moves the belts clear of the formed bale 56 and allows the formed and wrapped bale 56 to be discharged through the rearward end 38 of the baling chamber 54.

Referring to FIG. 2, the housing 32 includes a first side wall 76 positioned generally parallel with the first circular end face 58 of the bale 56 during formation of the bale 56 in the bale formation system 52. The housing 32 includes a second side wall 78 positioned generally parallel with the second circular end face 60 of the bale 56 during formation of the bale 56 in the bale formation system 52. It should be appreciated that the first circular end face 58 and the first side wall 76 may be positioned on either the left side or the right side of the round baler 20, relative to the direction of travel 40 of the round baler 20 while gathering crop material, with the second circular end face 60 and the second side wall 78 positioned on the other of the left side or the right side of the round baler 20, opposite the first circular end face 58 and the first side wall 76.

In some circumstances and/or for some baling operations, it is desirable to measure or otherwise determine a weight of the bale 56 after formation and before being discharged from the interior region 34 of the round baler 20 and onto the ground surface 46. One process of determining the weight of the bale 56 is to fully support the bale 56 on the gate 36, and measure the force applied to one or more hydraulic gate cylinders 80 holding the gate 36 and the bale 56 in an intermediate position. In order to do so, the bale 56 and the gate 36 are be moved to the intermediate position, such that the weight of the bale 56 is fully supported by the gate 36.

In the intermediate position, one or more pressure or force sensors (not shown) may sense data related to the forces acting on the hydraulic cylinders holding the gate 36 in the intermediate position. Knowing theses forces and the weight and geometry of the gate 36, the weight of the bale 56 is accurately determined. In order to accurately make this determination, however, the bale 56 should be consistently positioned relative to the gate 36. In order to consistently position the bale 56 on the gate 36 in the intermediate position, the rotation of the forming belts 64 in the endless loop may need to be stopped so that the forming belts 64 do not rotate the bale 56 when in the intermediate position. Additionally, tension in the forming belts 64 may need to be reduced, i.e., slack introduced into the forming belts 64, so that the forming belts 64 do not discharge the bale 56 from the gate 36 when in the intermediate position.

Referring to FIG. 2, the take-up roller 68 is moveably attached to either the gate 36 or the housing 32 in a suitable manner that allows the take-up roller 68 to move relative to the gate 36 and/or the housing 32 as the gate 36 moves between the open position and the closed position, so that the take-up roller 68 maintains tension and/or reduces slack in the forming belts 64 as the gate 36 moves from the closed position into the open position. As used herein, the term "tension" is defined as a force that tends to produce an elongation of a body or structure. As used herein, the term "slack" is defined as looseness in the forming belts 64, i.e., not taut. It should be appreciated that increasing tension of the forming belts 64 reduces slack in the forming belts 64, whereas decreasing tension in the forming belts 64 introduces slack into the forming belts 64.

In one embodiment, the take-up roller 68 is attached to the gate 36 via a take-up shaft 82 and an interconnecting roller lever 84. However, it should be appreciated that the take-up roller 68 may be attached to the gate 36 or the housing 32 in some other manner not shown in the Figures or described herein. The take-up shaft 82 extends between the first side wall 76 and the second side wall 78 of the housing 32. The take-up shaft 82 defines a shaft axis 86. The shaft axis 86 is a longitudinal center of the take-up shaft 82, and generally extends perpendicular to the central longitudinal axis 44 of the round baler 20. The shaft axis 86 is generally parallel with the gate rotation axis 42. The take-up roller 68 is attached to the take-up shaft 82, with the take-up roller 68 rotatable with the take-up shaft 82 about the shaft axis 86, relative to the gate 36 and/or the housing 32. In one embodiment, the take-up shaft 82 is rotatably attached to the gate 36. However, in other implementations, the take-up shaft 82 may be rotatably attached to the housing 32.

The roller lever 84 is attached to and rotatable with the take-up shaft 82 about the shaft axis 86. The roller lever 84 interconnects the take-up shaft 82 and the take-up roller 68. While only a single roller lever 84 is described herein, it should be appreciated that the round baler 20 may include multiple roller levers 84 interconnecting the take-up shaft 82 and the take-up roller 68. For example, in the implementation shown in the Figures, a first roller lever 84A is disposed adjacent the first side wall 76, and a second roller lever 84B is disposed adjacent the second side wall 78 of the housing 32. A first end 88 of the roller lever 84 is fixedly attached to the take-up shaft 82. The take-up roller 68 is rotatably mounted to a second end 90 of the roller lever 84, such as with a bearing or other similar mounting. The roller lever 84 positions the take-up roller 68 away from the shaft axis 86 by a radial distance.

Figure 4:
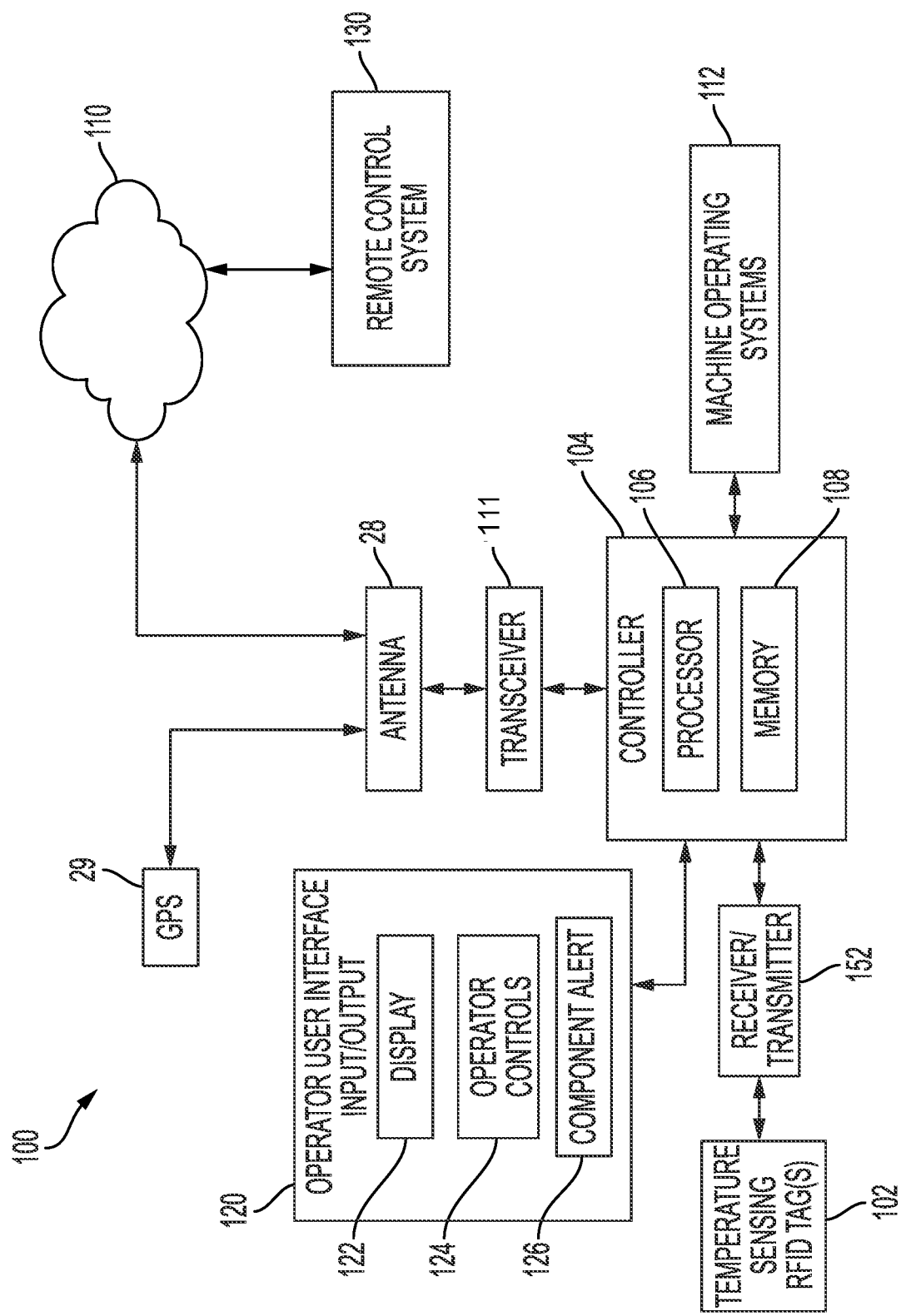
FIG. 4 is a schematic block diagram of a control system configured to determine a fault condition of a component or system of a work machine.

FIG. 4 illustrates a schematic block diagram of a control system 100 configured to determine a component or systems malfunction or failure of the baler 20 using one or more temperature sensing radio frequency identification (RFID) tags 102 that identify heat generated by a component. The control system 100 includes one or more electronic controllers 104, also known as an electronic control unit (ECU), each of which is connected to a controller area network (CAN) bus (not shown) and to the various devices, systems, parts, or components of the tractor 10 and the baler 20. The CAN bus is configured to transmit electric signals for the control of various devices connected to the bus as well as to transmit status signals that identify the status of the connected devices.

The controller 104, in different embodiments, includes a computer, computer system, or other programmable devices. In these and other embodiments, the controller 104 includes one or more processors 106 (e.g. microprocessors), and an associated memory 108, which can be internal to the processor or external to the processor. The memory 108 includes, in different embodiments, random access memory (RAM) devices comprising the memory storage of the controller 104, as well as any other types of memory, e.g., cache memories, non-volatile or backup memories, programmable memories, or flash memories, and read-only memories. In addition, the memory can include a memory storage physically located elsewhere from the processing devices, and can include any cache memory in a processing device, as well as any storage capacity used as a virtual memory, e.g., as stored on a mass storage device or another computer coupled to controller 104. The mass storage device can include a cache or other dataspace which can include databases. Memory storage, in other embodiments, is located in a cloud system 110, also known as the "cloud", where the memory is located in the cloud at a distant location from the machine to provide the stored information wirelessly to the controller 104 through the antenna 28 operatively connected to a transceiver 111, which is operatively connected to the controller 104. When referring to the controller 104, the processor 106, and the memory 108, other types of controllers, processors, and memory are contemplated. Use of the cloud for storing data leads to storage economies of scale at a centrally located operation's center, where data from a large number of balers is stored. In other embodiments, data from other types of work machines is stored.

The controller 104 executes or otherwise relies upon computer software applications, components, programs, objects, modules, or data structures, etc. Software routines resident in the included memory 108 of the controller 104, or other memory, are executed in response to the signals received from the RFID sensors 102 which are located on, at or within the baler 20 as described herein. The controller 104 also receives signals from other controllers such as an engine controller and a transmission controller. The controller 104, in other embodiments, also relies on one or more computer software applications, that are located in the "cloud" 110, where the cloud generally refers to a network storing data and/or computer software programs accessed through the internet. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

The tractor 10 and the baler 20 include a plurality of other types of sensors, in addition to the RFID tag sensors 102, each of which in different embodiments, identifies machine device status and transmits sensor information to the controller 104. In one embodiment, different types of machine operating systems 112 are configured to perform work machine functions as would be understood by one skilled in the art. The conditions and statuses of these machine operating systems 112 are transmitted as signals to the controller 104 as is understood by one skilled in the art.

An operator user interface 120 is operatively connected to the controller 104 and is located in the cab 26 to display machine information to an operator, located in the cab 26, as well as to enable the operator to control operations of the tractor 10, the baler 20, or other work machines. The user interface 120 includes a display 122 to display status information directed to the condition or status of the machine 10 as well as the baler 20. Status information includes, but is not limited to, the operating status of a machine operating system 112 including various components, parts, or systems of the baler 20. The user interface 120 further includes operator controls 124 configured to enable the operator to control the various functions and features of the machine operating system 112. A component alert device 126 is located at the user interface 120 and provides an alert function to an operator for alerting the operator in the event of a system, part, or component being found to be subject to a malfunction. As used herein, system, part, device, and component are used interchangeably when identifying a fault condition with the RFID temperature sensor. The alert device 126 includes, but is not limited to, a visual alert, a sound alert, or a transmitted alert to a remote receiver.

In one embodiment, electrical communication between the tractor 10 and the baler 20 is through an electrical cable, not shown, disposed along the connection 33. In other embodiments, sensor information and machine operating systems information is transmitted wirelessly between the tractor 10 and the baler 32.

Other work machines are known as autonomous machines are controlled remotely without operator intervention at the machine itself. In such a system, a remote control system 130 is used to remotely control operation of the machine 10 or baler 20 through web-based communication tools and platforms with the cloud 110, as is understood by those skilled in the art. In one embodiment, an operator or manager is located at the remote control system 130, which due to its cloud communication protocol, is located remotely from the machine 10 and the baler 20. In such an embodiment, the control system 100 is a distributed control system having components locate at one or more of the work machines, the cloud, and the remote control system.

In a remotely controlled machine in which the operator is not located at the work machine, or in an operator controlled machine, the control system 100 is configured to identify when a component or system of the machine being monitored has been damaged, through wear or through breakage. One or more of the temperature sensing RFID tags 102 are configured to sense temperature generated by moving parts of the machine and its components and to transmit the temperature to the controller 104, either wirelessly or by wire. In different embodiments, the RFID sensor identify only temperature. Temperature sensing can be achieved on certain specialized RFID tags by analyzing the change in impedance of the circuit based on temperature. In other embodiments, the RFID sensor includes a component identifier that identifies the component to which the sensor is attached as identifying the temperature of the identified component.

Figure 5:
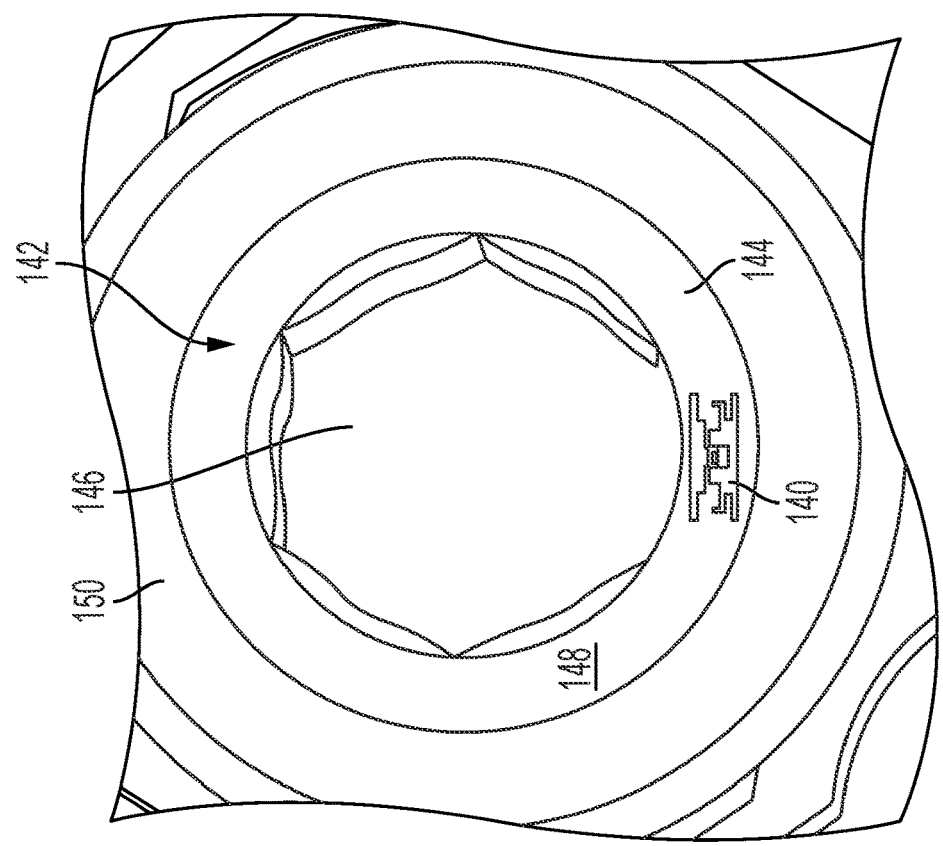
FIG. 5 illustrates an RFID sensor coupled to a bearing.

In different embodiments, the sensors 102 are located at or within the baler 20 to identify a temperature of the part, component, or device at which the sensor is located. For instance, as illustrated in FIG. 5, an RFID sensor 140 is coupled to a bearing 142. The RFID sensor 140 is attached by one or more couplers, such as by an adhesive, to a surface 144 of the bearing 142. In one embodiment, the adhesive is relatively robust to insure that the sensor 140 does not become dislodged from its location during operation of the bearing. In other embodiments, the sensor 140 is mounted to a plate and the plate is coupled to the bearing by connectors. Other types of couplers are contemplated.

The bearing supports a shaft (not shown) in an aperture 146, such as a shaft supporting one of the rollers 66. In the embodiment of FIG. 5, the sensor 140 is located on a bearing ring 148 that rotates with respect to a bearing housing 150.

As the bearing ring 148 rotates, an operating temperature is generated near or at the bearing ring 148. The sensor 140 determines the temperature of the bearing ring 148. The receiver/transmitter 152 (see FIG. 4) interrogates the sensor 140, as is understood by one skilled in the art. In response to the interrogation, the receiver/transmitter 152 receives a temperature signal from the sensor 140, which is transmitted to the controller 104. In another embodiment, the sensor 140 is coupled to the bearing housing 150.

Figure 6:
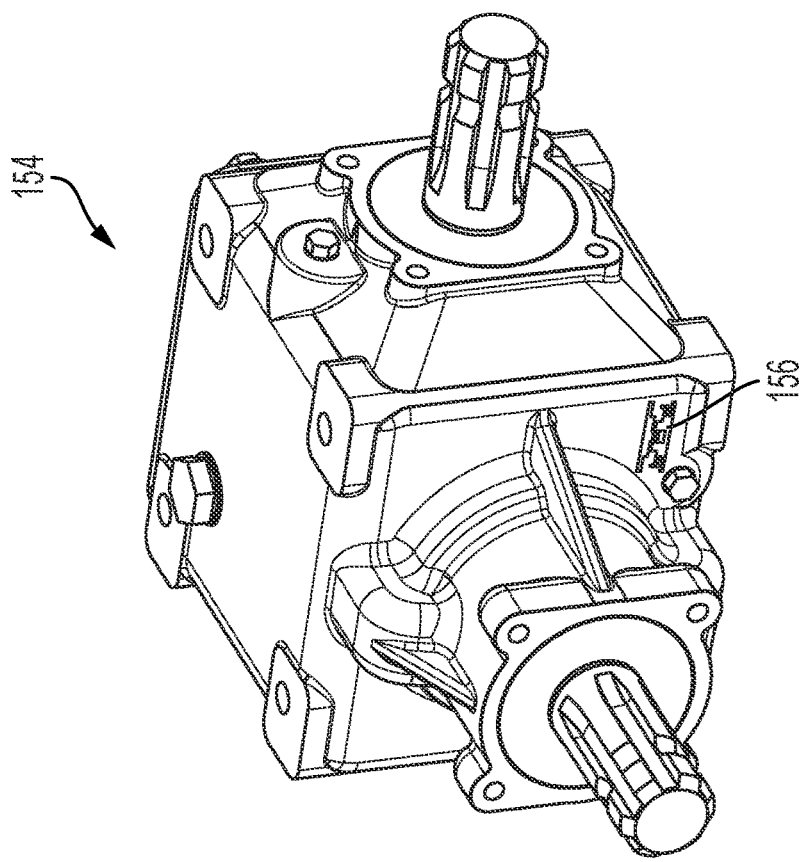
FIG. 6 illustrates an RFID sensor coupled to a gearbox.

FIG. 6 illustrates a gearbox 154 covered by the housing 35 of FIG. 3. A temperature sensing RFID sensor 156 is coupled to an exterior surface of the gearbox 154 to sense the temperature of the gearbox 154. While a particular location of the sensor 156 is illustrated, other locations of the sensor 156 on the gearbox 156 are contemplated.

In different embodiments, RFID sensors are located at sensing locations that are considered to experience undesirable operating temperatures during operation of the baler. By locating, the sensor at locations of potential undesirable temperature change, the controller 104, under many conditions, makes a determination of changes in sensed temperature. For instance, in one embodiment, the controller 104 determines a change in sensed temperature from a non-operating temperature to an operating temperature. If the change is too great, then an alert is generated at the component alert 126. In other embodiments, the sensed temperature is compared to a threshold temperature that is stored in memory. Because different parts, component, devices, and systems generate different values of temperature, a table of threshold temperature threshold located in a stored lookup table are used to provide an alert.

Figure 7:
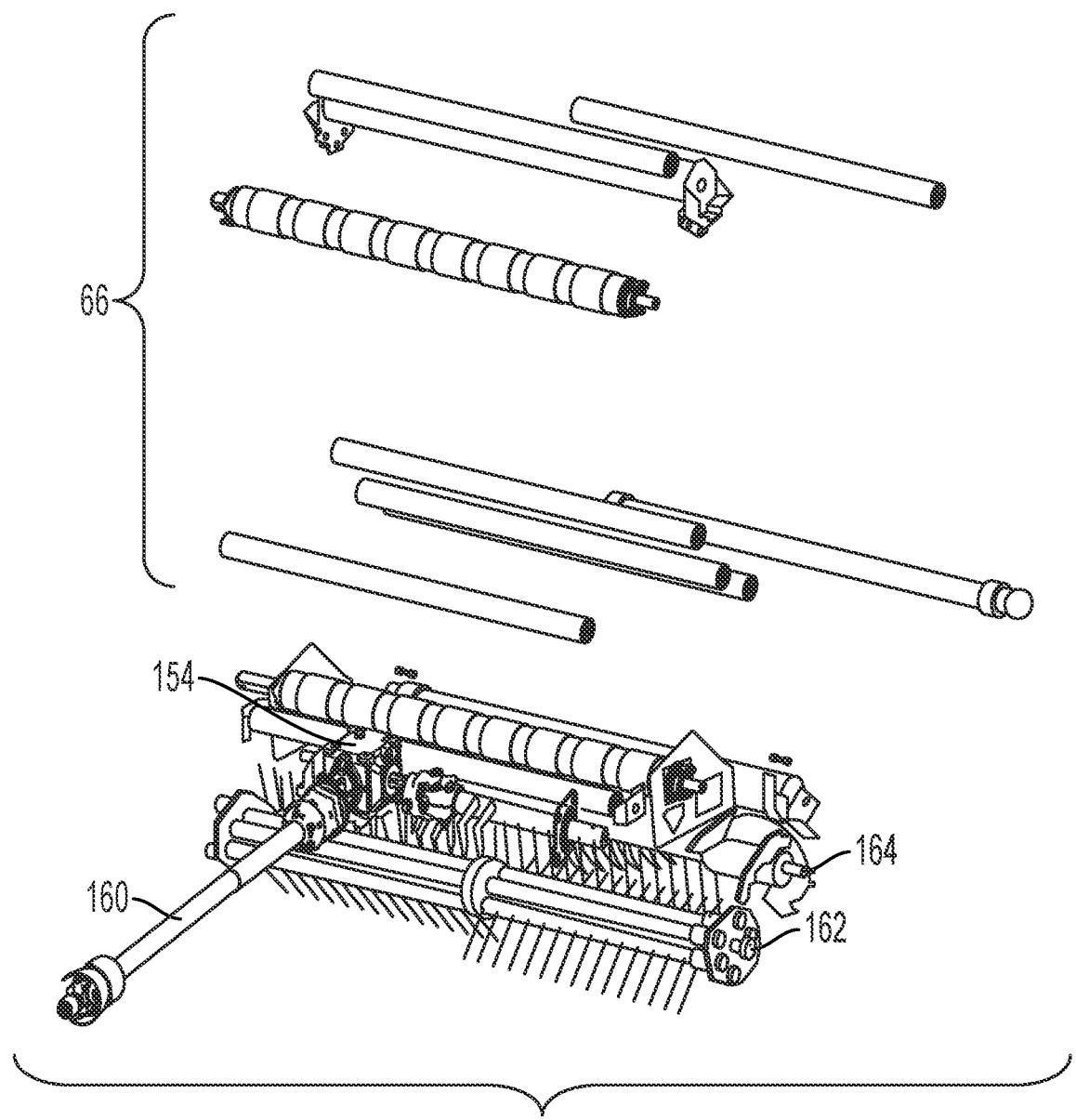
FIG. 7 illustrates components of the baler of FIG. 2.

FIG. 7 illustrates some of the parts, but not all of the parts of the baler 20, at which the RFID sensors 140 are located in one or more embodiments. In this illustration, certain parts are identified as being candidates for temperature monitoring due to the function of those parts as well as the likelihood of temperature changes occurring during harvesting that could result in part or system damage. Other locations of RFID sensor 140 within or at baler 20 are contemplated. While not shown in FIG. 7, one or more sensors 140 are located on a PTO driveline 160, a crop pickup assembly 162, a crop feeding rotor 164, and the gearbox 154. In addition, one or more of the bale rollers 66 each have an associated RFID sensor 140 to identify the temperature of the roller and/or a support mechanism, such as an associated bearing supporting the roller. In one embodiment bale roller sensors are located at bearing supporting rotation of the bale roller. In other embodiments, the baler is a self-propelled machine and does not include a PTO driveline.

Figure 8:
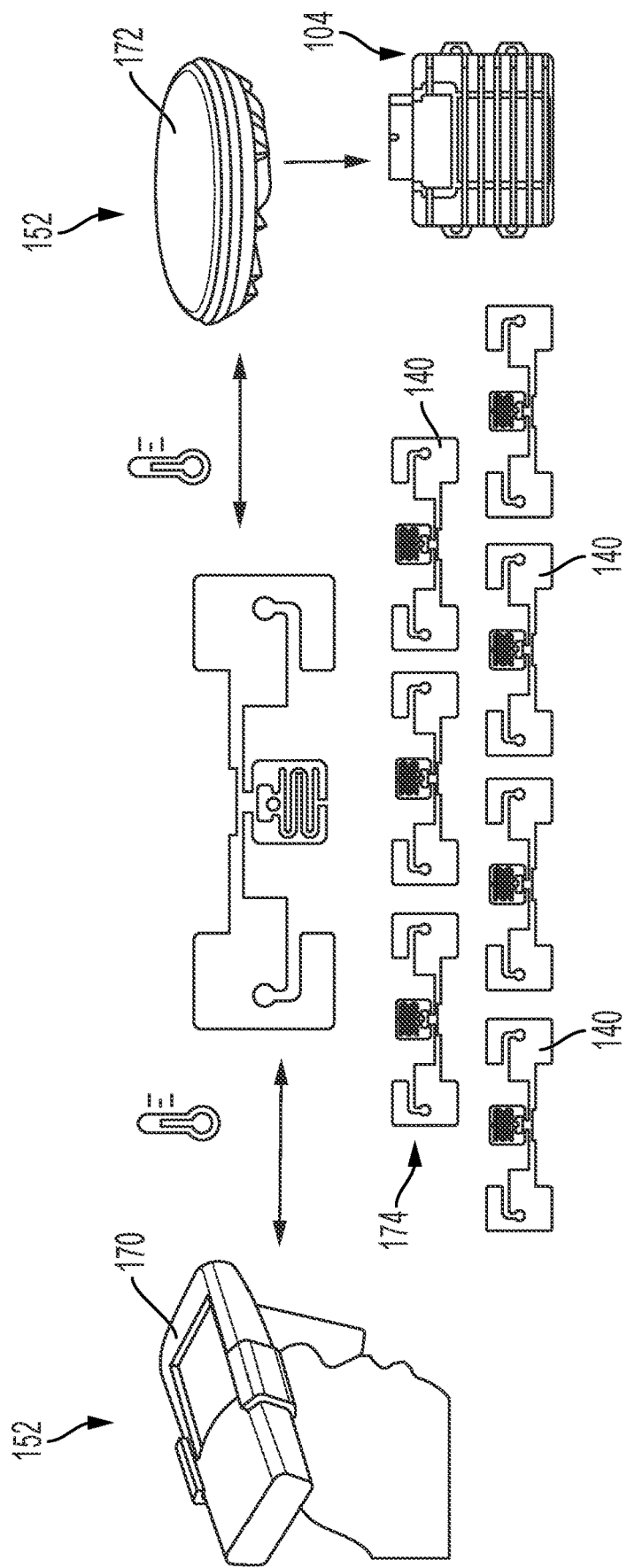
FIG. 8 illustrates a network of RFID sensors.

The receiver/transmitter 152 of FIG. 4, in different embodiments, includes an RFID reader that is either located at the baler 20, the tractor 10, or is remotely located from either the tractor 10 or the baler 20. In one embodiment, as seen in FIG. 8, the receiver/transmitter 152 is a hand-held reader 170. In another embodiment illustrated in FIG. 8, the receiver/transmitter 152 is equipment dedicated reader 172. Each of the readers 170 and 172 is configured to interrogate one or more sensors 140 and to transmit received sensor information to the controller 104. Each of the reader identifies two values, the temperature of the associated component and an identity of the component at which the RFID sensor is located. Since each of the RFID sensors includes a unique component identifier, the sensed temperature is associated with a particular component. In this way, components that experience improper temperatures are identified. By using a multiplicity of network of RFID sensors 140 as part of the RFID sensor system, a determination of machine health is determined and used to provide a temperature alert, i.e. a fault condition, to the operator or equipment manager. In one or more embodiments, the RFID sensors are located at components most critical to uptime. In the case of the handheld reader 170, the signal identifying temperature and identifiers is transmitted to the antenna 28 of FIG. 4. In one embodiment, each of the RFID sensors provides a temperature of an associated component, which is not a high enough temperature by itself to trigger a component alert. In this embodiment, however, if a large number of components registers high values, a system alert is provided to the operator or user to make an investigation into the cause of the higher temperatures.

The controller 104 is configured to determine the operating status of components based the identified temperatures of the monitored components. Temperature data is processed with controller software applied to make decisions about machine health based on different procedures. High temperatures, in one or more embodiments, are an indication of pending mechanical failure. The controller 104, in different embodiments is configured to identify fault conditions that indicate potential mechanical malfunctions or failures in one or more identification schemes as follows:

1) Absolute threshold: a temperature at which dry crop matter combusts (230 degrees F.) minus a safety factor;
2) Relative threshold: a temperature change compared to an original ambient temperature and an operating temperature of the monitored component;
3) Expected temperature: determined by location of mounting (e.g. gearbox), where threshold is set based on a known out of bounds temperature limit, i.e. a predetermined threshold temperature, based on the type of component;
4) Comparative temperature: one location is measurably higher than other similar locations (e.g. left vs. right);
5) Rate of change: an unexpected increase in temperature based on operating mode over a predetermined period of time; and
6) Loss of signal: indicates a loss of sensor or failure of component (e.g. pickup tine missing with attached sensor).

These and other identifications of a fault condition include, but are not limited to: and absolute threshold, a relative threshold, an expected temperature threshold, a comparative temperature, or a change in temperature over a period of time.

In another embodiment, the handheld RFID reader 170, a plurality of RFID tags, and a software package to read and analyze data transmitted by the RFID tags are supplied as a kit that is provided to a manufacturer, a technician, or an end user to be incorporated into a baler or other work machine. The software package, in different embodiments, includes a user interface such as that described with respect to FIG. 9. In one or more kits, a controller is not provided and the software package is configured to operate on a specific controller as needed by the end user.

Figure 9:
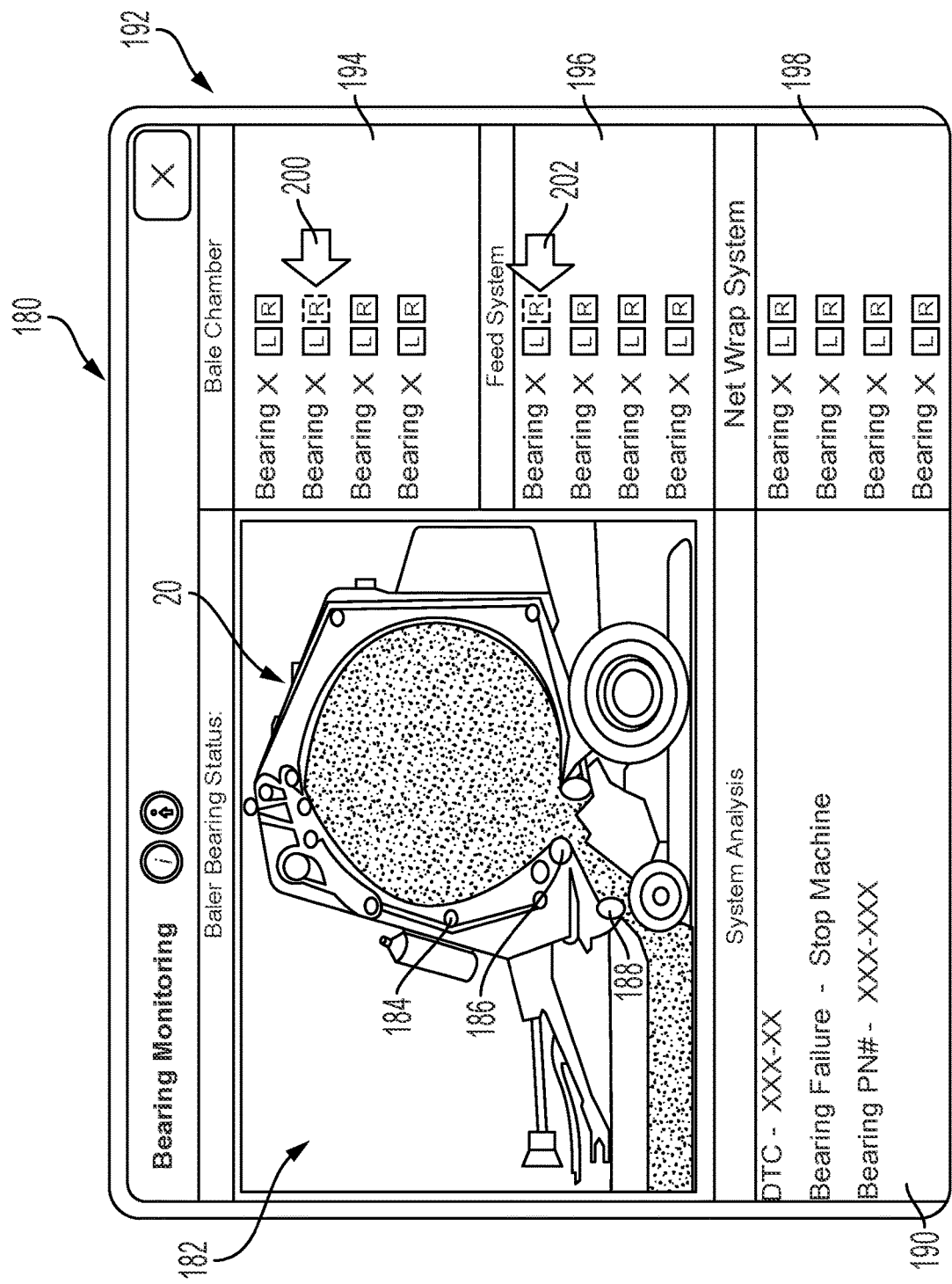
FIG. 9 illustrates an embodiment of a screen display.

The controller 104 identifies potential mechanical failures and transmits relevant information to the user interface where it is displayed on the display 122. FIG. 9 illustrates one embodiment of a screen display 180 that is provided to the display 122. As seen in FIG. 9, the screen display includes a plurality of sections, each of which is dedicated to a particular grouping of information. A first section 182 includes an illustration of the baler 20 which identifies the status of different components, including bearings and the location of the bearings. Each of the bearing's locations is shown and a condition of the bearing is identified with a status based on color. For instance, a first bearing 184 is identified with a first color, such as green, to indicate that the identified bearing is operating at a normal operating temperature. A second bearing 186 is identified with a second color, such as yellow, to indicate the identified bearing is operating outside a normal temperature. A third bearing 188 is identified with third color, such as gray, to indicate that the RFID sensor is not communicating. Other colors or greyscale shades are contemplated as well as icons of different types to indicate status.

A second section, the summary section 190, is dedicated to illustrating summary information. In this section, at least one embodiment includes an identification of a diagnostic trouble code (DTC), an identification of the type of failure, i.e. bearing failure stop machine, and a bearing part number. Other DTC's, types of failure and part numbers are contemplated. Section 190 in another embodiment illustrates a historical pattern of the bearing temperatures.

A third section 192 is dedicated to illustrate system status including status of a bale chamber 194, a feed system 196, and a net wrap system 198. Each of these subsection identifies the status of parts location in the identified system by part number, location; i.e. left (L) or right (R), and a status of the left or right part by a color code. For instance, the arrow 200 points to an "R" identified by the color red to indicate an imminent failure which requires the machine operation to be stopped. The arrow 202 points to an "R" identified by the color yellow that indicates that the identified part should be investigated soon and repaired or replaced as necessary.

As described herein, the detection system identifies operating conditions that lead to component malfunctions or failure using RFID tags that are customized to include part numbers identifying the location of the RFID tags. Since the RFID tags are a passive, devices the cost of such tags is relatively inexpensive that leads to a large number of tags being used as needed. In one embodiment, the RFID tags include a longer antenna, than typically seen RFID applications such as used in a commercial setting. The longer antenna also provides for wrapping the RFID tag around a part, such as a bearing, to improve reception. Since there are over 100 possible bearing locations on baler, the low cost of RFID tags provides for an improved assessment of baler operations.

Alternate embodiments of the control system include the RFID sensor being located at a variety of different locations. For instance, in different embodiments, the RFID sensor is mounted directly to the work machine. Such work machines include, but are not limited to a harvesting unit such as the baler towed behind a tractor described herein, or a self-propelled work machine. In another embodiment, the hand-held or mobile reader includes the use of an RFID interrogator held or operated by a technician or an operator, but not mounted directly on the work machine. For instance, the technician could use the reader as part of a regularly scheduled maintenance check to determine if a component, such as a bearing, has been damaged or has failed during use. In one embodiment, the hand-held reader includes a cell phone or mobile telephone having an application (app) configured to identify machine failure or malfunction. A dedicated hand-held device is also contemplated. In a further embodiment, the RFID reader is mounted on a tractor in which the RFID reader is directed toward the work machine.

Due to the low cost of the RFID sensors, redundancy is used in different embodiments, to improve the accuracy and reliability of the sensing system. Redundant sensors are also used to diagnose a sensor failure when there is a data mismatch. In addition, the machine health data not only is used real time to alert the operator at the point of use, but is stored, in some embodiments, for historical reasons and shared to the cloud for remote fleet management.

While embodiments incorporating the principles of the present disclosure have been disclosed hereinabove, the present disclosure is not limited to the disclosed embodiments. Consequently, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of detecting a fault condition in one or more balers, each of which includes a crop feed system and a bale chamber, wherein each of the one or more balers is configured to bale cut crop, the method comprising:
   identifying at least one location in the one or more balers, wherein the at least one identified location generates heat during an operation of a component of the baler;
   placing a radio frequency identification (RFID) tag at the at least one identified location, wherein the RFID tag includes a temperature sensing feature;
   receiving transmitted data from the RFID tag;
   identifying, from the received data, a temperature value of the at least one identified location; and
   providing an indictor based on the identified temperature value.

2. The method of claim 1 wherein the receiving the transmitted data includes receiving transmitted data having a first component and a second component, wherein the first component includes a location identifier and the second component includes the temperature value.

3. The method of claim 2, wherein the location identifier includes an identifier identifying the component identified by location.

4. The method of claim 2 further comprising comparing the temperature value to a threshold value.

5. The method of claim 4 wherein the providing an indicator further comprises providing an indicator if the comparison of the temperature value to the threshold value indicates an occurrence of a fault condition at the at least one location.

6. The method of claim 5 wherein the threshold value is one of a predetermined temperature threshold value or an ambient temperature value.

7. The method of claim 1 wherein the providing an indicator further comprises providing an alert, wherein the alert is one of a visual alert, a sound alert, or a transmitted alert to a remote receiver.

8. The method of claim 1 further comprising placing a second RFID tag at or near the at least one location, wherein the second RFID tag includes a temperature sensing feature.

9. The method of claim 8 further comprising receiving second data from the second RFID tag and comparing the second data from the second RFID tag to the data from the first mentioned RFID tag to determine a fault condition related to one or both of the first mentioned RFID tag and the second RFID tag.

10. The method of claim 1 wherein the identifying at least one location further comprises identifying at least one moving component in a plurality of the one or more balers wherein the at least one moving component is located in the crop feed system or the bale chamber, in each of a plurality of balers.

11. The method of claim 10 wherein the placing an RFID tag includes placing an RFID tag at or near the at least one moving component in each of the plurality of balers.

12. A system for identifying a fault condition in one or more balers, each of which includes a plurality of components, the system comprising:
 one or more RFID tags, wherein each of the one or more RFID tags includes a temperature sensor and a coupler to connect each one of the one or more RFID tags to a location at, near, or on one of the plurality of components;
 a receiver configured to receive temperature information from each of the one or more RFID tags;
 a user interface;
 a controller operatively connected to the receiver and to the user interface, the controller including a processor and a memory, wherein the memory is configured to store program instructions and the processor is configured to execute the stored program instructions to:
 receive temperature information from the receiver;
 identify a fault condition of one or more of the plurality of components based on the received temperature information; and
 display an indicator at the user interface based on the identified fault condition.

13. The system of claim 12 wherein the identify a fault condition includes comparing the received temperature information to a predetermined temperature.

14. The system of claim 13 wherein the predetermined temperature is one of an absolute threshold, a relative threshold, an expected temperature, a comparative temperature, or a change in temperature over a period of time.

15. The system of claim 12 wherein the system comprises one of a self-propelled bailer or a towed baler.

16. The system of claim 12 wherein the system comprises a kit configured to be located on one of a self-propelled baler or a towed baler.

17. A baler configured to bale cut crop, the baler comprising:
 a crop feed system and a bale chamber;
 one or more RFID tags, each of which includes a temperature sensing feature, wherein each of the one or more RFID tags is located on, at, or near a component of the baler;
 an RFID tag reader configured to receive temperature information from the one or more RFID tags;
 a user interface including one or more indicators;
 a controller operatively connected to the user interface and to the RFID tag reader, the controller including a processor and a memory, wherein the memory is configured to store program instructions and the processor is configured to execute the stored program instructions to:
 receive the temperature information from the RFID tag reader;
 identify a fault condition of one or more of the plurality of components based on the received temperature information; and
 activate one of the one or more indicators at the user interface based on the identified fault condition.

18. The baler of claim 17 wherein the identify a fault condition includes comparing the received temperature information to a predetermined temperature.

19. The baler of claim 18 wherein the predetermined temperature is one of an absolute threshold, a relative threshold, an expected temperature, a comparative temperature, or a change in temperature over a period of time.

20. The baler of claim 19 wherein the identify a fault condition of one or more of the plurality of components is an absence of the receipt of temperature information from one or more of the RFID tags.

\* \* \* \* \*